(12) United States Patent
Ao et al.

(10) Patent No.: US 8,423,857 B2
(45) Date of Patent: Apr. 16, 2013

(54) METHOD FOR END-TO-END HYBRID AUTOMATIC REPEAT REQUEST AND SYSTEM THEREOF

(75) Inventors: Weng-Chon Ao, Taipei (TW); Kwang-Cheng Chen, Taipei (TW)

(73) Assignee: Acer Incorporated, New Taipei (TW)

( * ) Notice: Subject to any disclaimer, the term of this patent is extended or adjusted under 35 U.S.C. 154(b) by 402 days.

(21) Appl. No.: 12/838,510

(22) Filed: Jul. 19, 2010

(65) Prior Publication Data

US 2011/0296268 A1 Dec. 1, 2011

(30) Foreign Application Priority Data

May 27, 2010 (TW) ................................ 99117019 A

(51) Int. Cl.
*G08C 25/02* (2006.01)
*H04L 1/18* (2006.01)
*H04J 3/16* (2006.01)
*H04J 3/22* (2006.01)
(52) U.S. Cl.
USPC .......................................... 714/748; 370/465
(58) Field of Classification Search ......................... None
See application file for complete search history.

(56) References Cited

U.S. PATENT DOCUMENTS

| 7,447,968 | B2 * | 11/2008 | Ha et al. ........................ | 714/748 |
| 8,060,017 | B2 * | 11/2011 | Schlicht et al. .............. | 455/41.2 |
| 2003/0202500 | A1 * | 10/2003 | Ha et al. ........................ | 370/342 |
| 2006/0280159 | A1 * | 12/2006 | Bi et al. ........................ | 370/342 |
| 2009/0016265 | A1 * | 1/2009 | Katayama et al. ............ | 370/328 |
| 2009/0282309 | A1 * | 11/2009 | Yue et al. ...................... | 714/748 |
| 2010/0008312 | A1 * | 1/2010 | Viswanath ..................... | 370/329 |

* cited by examiner

*Primary Examiner* — Guerrier Merant
(74) *Attorney, Agent, or Firm* — Jianq Chyun IP Office

(57) ABSTRACT

A method for an end-to-end hybrid automatic repeat request and a system thereof are provided. The method is applicable in a cognitive radio network (CRN) including at least a source node and a destination node. There are paths between a source node and a destination node in the CRN, and each path has a plurality of wireless links. The method includes the following steps. The source node encodes information into a coded packet, divides the coded packet into coded sub-packets, and transmits the coded sub-packets to the paths. Through the wireless links of each path, a coded sub-packet is amplified and forwarded to the destination node. In addition, the destination node combines the coded sub-packets for decoding so as to recover the information, and transmits an acknowledgement packet to the source node for notifying whether the information is successfully recovered.

20 Claims, 5 Drawing Sheets

METHOD FOR END-TO-END HYBRID AUTOMATIC REPEAT REQUEST AND SYSTEM THEREOF

CROSS-REFERENCE TO RELATED APPLICATION

This application claims the priority benefit of Taiwan application serial No. 99117019, filed on May 27, 2010. The entirety of the above-mentioned patent application is hereby incorporated by reference herein and made a part of this specification.

BACKGROUND

1. Field of the Invention

The invention relates to a method for a hybrid automatic repeat request. More particularly, the invention relates to a method for an end-to-end hybrid automatic repeat request and a system thereof used in cognitive radio networks of multi-hop relay.

2. Description of Related Art

Cognitive radio network (CRN) technology is used to improve a spectrum utilization efficiency of wireless communication. Each node in the CRN can detect whether or not neighbouring nodes in a primary wireless network having a licensed wireless spectrum are using the licensed wireless spectrum, and transmit data to the other neighbouring nodes in the CRN by using a time slot in which the neighbouring nodes in the primary wireless network do not use the licensed wireless spectrum. Accordingly, a transmission throughput can be effectively increased in a given bandwidth by using the CRN, and therefore the spectrum utilization efficiency can be relatively improved.

However, in the CRN, one or a plurality of multi-hop relay paths is required for transmitting packets from a source node to a destination node, and each one of the multi-hop relay paths has a plurality of uni-directional opportunistic wireless links. Each uni-directional opportunistic wireless link in each one of the multi-hop relay paths can just guarantee to obtain a uni-directional transmission opportunity, but cannot guarantee a transmission opportunity of an opposite direction. Therefore, the link of the CRN is lack of an error control mechanism in a link layer (level) and also lack of an automatic repeat transmission mechanism in the link layer (level), which is developed with the assumption of link bi-directionality.

Accordingly, assuming the destination node in the CRN detects an error of a received packet, by using a conventional automatic repeat request in link layer (level), the destination node cannot feedback the negative acknowledgment to the source node since the link is uni-directional. Therefore, efficient operation of the CRN cannot be achieved, and the transmission throughput and the spectrum utilization efficiency cannot be improved.

SUMMARY

Accordingly, exemplary embodiments of the invention provide a method for an end-to-end hybrid automatic repeat request and a system thereof, which are adapted to a cognitive radio network (CRN). In the method for the end-to-end hybrid automatic repeat request, coded cooperation is applied among a plurality of multi-hop relay paths, and a plurality of nodes on each one of the multi-hop relay paths sequentially amplifies and forwards a coded sub-packet from a source node to a destination node through a plurality of wireless links, so as to implement the end-to-end hybrid automatic repeat request in the CRN, and further achieve an end-to-end error control in a session level.

In the method for the end-to-end hybrid automatic repeat request provided by the invention, the proportion of information included in each one of coded sub-packets is dynamically adjusted according to a channel distribution information (or CDI) of each one of the multi-hop relay paths, which is fulfilled by effectively use of a puncture code. As a result, the proportion of information transmitted to each one of the multi-hop relay paths is different, so as to minimize the outage probability and achieve a relatively high transmission throughput.

In the method for the end-to-end hybrid automatic repeat request provided by the invention, a number of the multi-hop relay paths used for forwarding the coded sub-packets is dynamically adjusted according to a communication quality state (i.e., information piggybacked with the acknowledgement from the destination node) of each one of the multi-hop relay paths, and the multi-hop relay paths with better effective channel qualities (i.e., effective end-to-end signal-to-noise ratio values) are selected, so as to effectively use a feature of spatial diversity to achieve a relatively high transmission throughput while the qualities of the multi-hop relay paths (referred to as paths hereinafter) are continuously varied.

According to an exemplary embodiment of the invention, the invention provides a method for an end-to-end hybrid automatic repeat request, which is adapted to a cognitive radio network (CRN) including at least a source node and a destination node. There is a plurality of paths between the source node and the destination node, and each path has a plurality of wireless links. The method includes the following steps. The source node encodes information into a coded packet, divides the coded packet into a plurality of coded sub-packets, and transmits the coded sub-packets to the paths. Through the wireless links of each one of the paths, a coded sub-packet is sequentially amplified and forwarded from the source node to the destination node. In addition, the destination node combines the coded sub-packets for decoding so as to recover the information, and transmits an acknowledgement packet to the source node through the paths for notifying the source node whether the information is successfully recovered.

In an exemplary embodiment of the invention, the CRN is a secondary wireless network having a plurality of nodes, and each node of the secondary wireless network uses a licensed wireless spectrum just when one or a plurality of neighbouring nodes in a primary wireless network is not in operation. Moreover, when one of the nodes in the secondary wireless network is about to transmit information, such node is the source node, and a destination of the information is the destination node. Moreover, a wireless link between two neighbouring nodes in the CRN is a uni-directional opportunistic wireless link, and a plurality of the uni-directional opportunistic wireless links forms a path, and such path has a feature of multi-hop relay.

In an exemplary embodiment of the invention, the method for the end-to-end hybrid automatic repeat request further includes following steps. If a channel distribution information (or CDI) of each one of the paths is unknown to the source node, the source node equally divides the coded packet into the coded sub-packets, and transmits the coded sub-packets to the paths.

In an exemplary embodiment of the invention, the method for the end-to-end hybrid automatic repeat request further includes following steps. If a CDI of each one of the paths is known to the source node, the source node unequally divides the coded packet into the coded sub-packets, and transmits the coded sub-packets to the paths.

In an exemplary embodiment of the invention, the method for the end-to-end hybrid automatic repeat request further includes following steps. The destination node discards one or a plurality of the coded sub-packets received after a predetermined delay waiting threshold is exceeded, and combines one or a plurality of the coded sub-packets received before the predetermined delay waiting threshold is reached for decoding, so as to recover the information.

In an exemplary embodiment of the invention, the method for the end-to-end hybrid automatic repeat request further includes following steps. At the source node, the coded sub-packets are transmitted through all of the paths to the destination node during a probe phase. At the destination node, a number of the paths used for receiving the coded sub-packets is decreased progressively, and at the destination node, a coded sub-packet on a path having a worst effective end-to-end signal-to-noise ratio (SNR) value is discarded during each decoding until the information is unable to be successfully recovered by using M−1 coded sub-packets. Also, the M paths having highest effective end-to-end SNR values are replied by the destination node to the source node, where M is an integer and then the probe phase is transitioned to a settling phase. Moreover, the M coded sub-packets respectively corresponding to the M paths are transmitted to the destination node through the M paths replied by the destination node during the settling phase if an acknowledgement packet replied by the destination node is received at the source node. In addition, it is transitioned from the settling phase to the probe phase if a negative acknowledgement packet replied by the destination node is received by the source node during the settling phase.

According to an exemplary embodiment of the invention, the invention provides an end-to-end hybrid automatic repeat request system, which is adapted to a cognitive radio network (CRN) having a plurality of nodes. The end-to-end hybrid automatic repeat request system includes a source node, the nodes and a destination node. When the source node is about to transmit information to the destination node, the source node encodes the information into a coded packet, and divides the coded packet into a plurality of coded sub-packets, where the source node is one of the nodes in the CRN. The nodes sequentially amplify and forward the coded sub-packets from the source node to the destination node, and amplify and forward an acknowledgement packet from the destination node to the source node. The nodes form a plurality of paths between the source node and the destination node, and the source node transmits the coded sub-packets to the paths. Moreover, the destination node combines the coded sub-packets for decoding so as to recover the information, and transmits the acknowledgement packet to the source node through the paths for notifying the source node whether the information is successfully recovered.

According to an exemplary embodiment of the invention, the invention provides an end-to-end hybrid automatic repeat request system, which is adapted to a cognitive radio network (CRN) having a plurality of nodes. The end-to-end hybrid automatic repeat request system includes a source node, the nodes and a destination node. When the source node is about to transmit a coded packet to the destination node, the source node divides the coded packet into a plurality of coded sub-packets, where the source node is one of the nodes in the CRN. The nodes sequentially amplify and forward the coded sub-packets to the destination node, and amplify and forward an acknowledgement packet to the source node. The nodes form a plurality of paths between the source node and the destination node, and the source node transmits the coded sub-packets to the paths. Moreover, the destination node combines the coded sub-packets for decoding so as to recover the coded packet, and transmits the acknowledgement packet to the source node through the paths for notifying the source node whether the coded packet is successfully recovered.

In view of the above, the invention provides a method for an end-to-end hybrid automatic repeat request and a system thereof. In the method, the source node encodes information into a coded packet, divides the coded packet into a plurality of coded sub-packets, and transmits the coded sub-packets to a plurality of the paths. The nodes on each one of the paths sequentially amplify and forward a coded sub-packet to the destination node through a plurality of wireless links. The destination node combines the coded sub-packets for decoding so as to recover the information, and transmits an acknowledgement packet to the source node through the paths, so as to implement an efficient end-to-end hybrid automatic repeat request and consequently an end-to-end error control in the CRN.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The invention provides a method for an end-to-end hybrid automatic repeat request and a system thereof, which are adapted to a cognitive radio network (CRN) having a plurality of nodes. In the following descriptions, a system structure of the CRN is introduced with reference of FIG. 1, detailed functions of main components in the CRN are introduced with reference of FIG. 2A-FIG. 2C, and detailed procedures of the method for the end-to-end hybrid automatic repeat request are introduced with reference of FIG. 3-FIG. 5.

Figure 1:
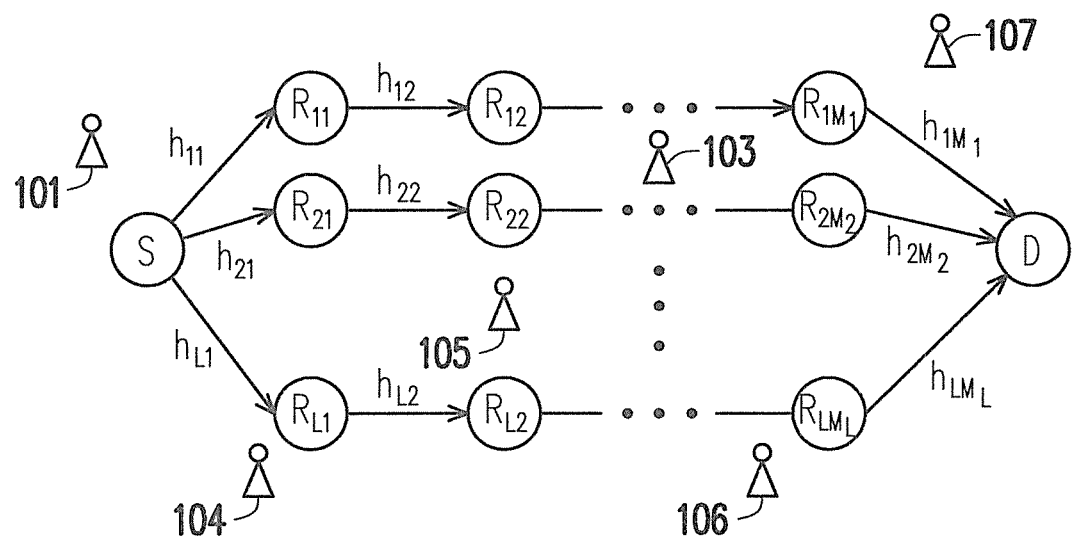
FIG. 1 is a schematic diagram illustrating a cognitive radio network (CRN) according to an exemplary embodiment of the invention.

FIG. 1 is a schematic diagram illustrating a cognitive radio network according to an exemplary embodiment of the invention. The CRN has a plurality of nodes, and the nodes includes at least one source node S, at least one destination node D and a plurality of relay nodes $R_{11}, R_{12}, \ldots, R_{1M_1}, R_{21}, R_{22}, \ldots, R_{2M_2}, R_{L1}, R_{L2}, \ldots$ and $R_{LM_L}$, etc. According to another aspect, the CRN coexists with at least one primary wireless network, and the primary wireless network includes a plurality of nodes 101, 102, 103, 104, 105, 106, 107, etc. surrounding the nodes of the CRN.

Referring to FIG. 1, the primary wireless network has a utilization priority for a licensed wireless spectrum. The CRN is a secondary wireless network relative to the primary wireless network, and each one of the nodes of the CRN can use the licensed wireless spectrum just when the neighbouring nodes in the primary wireless network are not in operation. In this way, a spectrum utilization efficiency of the licensed wireless spectrum can be improved. However, the invention is not limited thereto, and the CRN may include more than one source node and the corresponding destination node, and may include more than L multi-hop relay paths. Moreover, a portion of the nodes in the primary wireless network can be base stations or access points, and the other nodes in the primary wireless network can be mobile stations, wireless relay stations or wireless terminal stations. Since the invention focuses on related processing of multi-hop relay of the packets among the nodes in the CRN, detailed technical features of the primary wireless network are not further described in details. When one of the nodes in the CRN is about to transmit information, such node serves as the source node S, and a destination of the information serves as the destination node D.

Referring to FIG. 1, in the CRN, wireless links between each two neighbouring nodes are uni-directional opportunistic wireless links $h_{11}, h_{12}, \ldots, h_{1M_1}, h_{21}, h_{22}, \ldots, h_{2M_2}, h_{L1}, h_{L2}, \ldots$ and $h_{LM_L}$, etc. A plurality of uni-directional opportunistic wireless links forms a multi-hop relay path (referred to as a path hereinafter) between the source node S and the destination node D, i.e., the paths shown in FIG. 1. Therefore, in the CRN, each one of the paths has a feature of multi-hop relay, but the nodes in the CRN do not have an error control mechanism of a link layer (or link level) and an automatic repeat transmission mechanism of the link layer. Main functions and operations of the source node S, the destination node D and the relay nodes are further introduced below with reference of FIGS. 2A-2C.

Figure 2A:
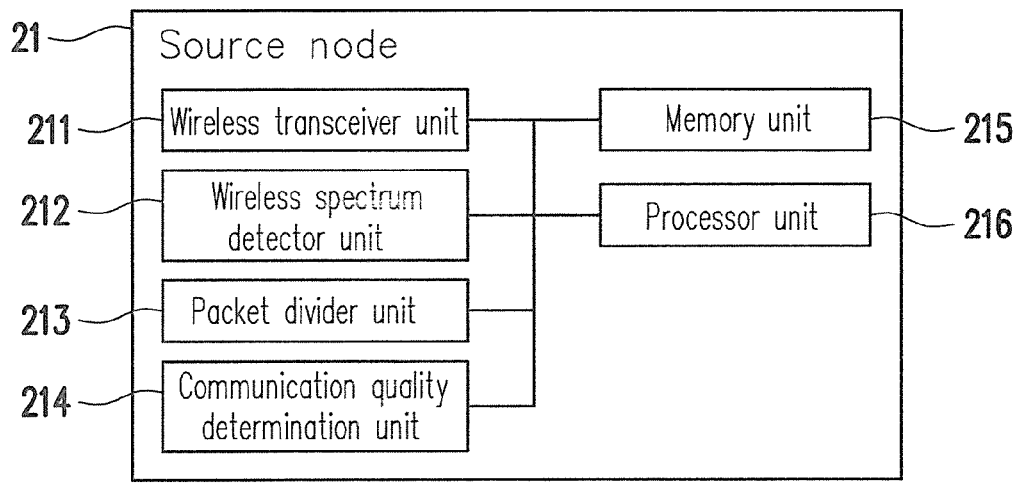
FIG. 2A is a functional block diagram of a source node in a CRN according to an exemplary embodiment of the invention.

FIG. 2A is a functional block diagram of a source node 21 (representing the source node S) in the CRN according to an exemplary embodiment of the invention. Referring to FIG. 2A, the source node 21 at least includes a wireless transceiver unit 211, a wireless spectrum detector unit 212, a packet divider unit 213, a communication quality determination unit 214, a memory unit 215 and a processing unit 216. The wireless transceiver unit 211 is used for transmitting a packet to a neighbouring relay node, or receiving a packet from the neighbouring relay node. The wireless spectrum detector unit 212 is connected to the wireless transceiver unit 211, and is configured for detecting whether one or a plurality of neighbouring nodes in the primary wireless network are in operation, so as to determine a time point suitable for using the licensed wireless spectrum. The packet divider unit 213 is connected to the wireless transceiver unit 211, and encodes information into a coded packet, and further divides the coded packet into one or a plurality of coded sub-packets according to a predetermined packet division principle, and then the wireless transceiver unit 211 transmits the coded sub-packets to a plurality of the neighbouring relay nodes. The communication quality determination unit 214 is configured for determining effective end-to-end communication qualities (for example, an effective end-to-end signal-to-nose ratio (effective end-to-end SNR)) of a plurality of paths (or relay paths) between the source node S and the destination node D.

Referring to FIG. 2A again, the memory unit 215 of the source node 21 is connected to the packet divider unit 213, and is configured for storing the information, the coded packet and the coded sub-packets, etc. The processing unit 216 is connected to the wireless transceiver unit 211, the wireless spectrum detector unit 212, the packet divider unit 213, the communication quality determination unit 214 and the memory unit 215, and is configured for coordinating and controlling these units.

Figure 2B:
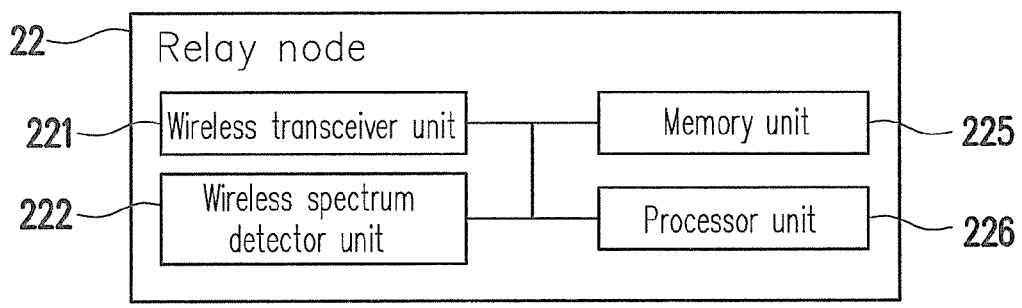
FIG. 2B is a functional block diagram of a relay node in a CRN according to an exemplary embodiment of the invention.

FIG. 2B is a functional block diagram of a relay node 22 in a CRN according to an exemplary embodiment of the invention. In the CRN, there is a uni-directional opportunistic wireless link between each one of the relay nodes and a neighbouring relay node, and a packet can be transmitted from one of the relay nodes to another relay node just when one or a plurality of the neighbouring nodes in the primary wireless network are not in operation.

As shown in FIG. 2B, the relay node 22 at least includes a wireless transceiver unit 221, a wireless spectrum detector unit 222, a memory unit 225 and processing unit 226. The wireless transceiver unit 221 is configured for receiving a packet from the source node S or a neighbouring relay node, and amplifying and forwarding such packet to another neighbouring relay node or the destination node D. The wireless spectrum detector unit 222 is connected to the wireless transceiver unit 221, and is configured for detecting whether one or a plurality of neighbouring nodes in the primary wireless network are in operation, so as to determine a time point suitable for using the licensed wireless spectrum. Moreover, the memory unit 225 of the relay node 22 is connected to the wireless transceiver unit 221, and is configured for storing the received packets. In addition, the processing unit 226 is connected to the wireless transceiver unit 221, the wireless spectrum detector unit 222 and the memory unit 225, and is configured for coordinating and controlling these units.

Figure 2C:
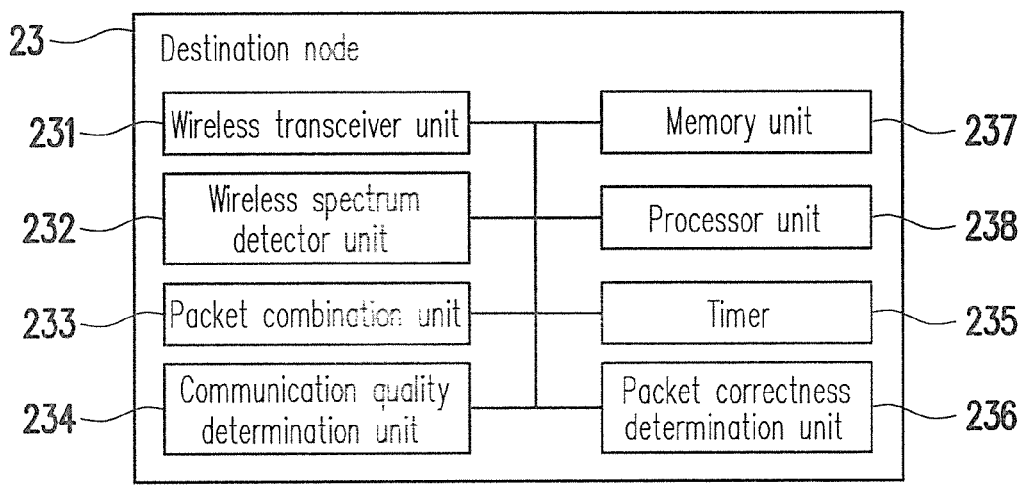
FIG. 2C is a functional block diagram of a destination node in a CRN according to an exemplary embodiment of the invention.

FIG. 2C is a functional block diagram of a destination node 23 (representing the destination node D) in a CRN according to an exemplary embodiment of the invention. The destination node 23 at least includes a wireless transceiver unit 231, a wireless spectrum detector unit 232, a packet combination unit 233, a communication quality determination unit 234, a timer 235, a packet correctness determination unit 236, a memory unit 237 and a processing unit 238.

Referring to FIG. 2C, the wireless transceiver unit 231 is configured for receiving a packet from a neighbouring relay node, or transmitting a packet to another neighbouring relay node. The wireless spectrum detector unit 232 is connected to the wireless transceiver unit 231, and is configured for detecting whether one or a plurality of neighbouring nodes in the primary wireless network are in operation, so as to determine a time point suitable for using the licensed wireless spectrum. The packet combination unit 233 is connected to the wireless transceiver unit 231, and is configured for combining the received coded sub-packets into the coded packet, and recovering the information in the coded packet through a decoding operation. The communication quality determination unit 234 is connected to the packet combination unit 233, and is configured for determining effective end-to-end communication qualities (for example, effective end-to-end SNR value) of a plurality of paths (or relay paths) between the source node S and the destination node D. The timer 235 is connected to the wireless transceiver unit 231 and the packet combination unit 233, and is configured for counting a predetermined delay waiting threshold. The packet combination unit 233 discards the coded sub-packets received after the predetermined delay waiting threshold is exceeded, and just combines the coded sub-packets received before the predetermined delay waiting threshold is reached, so as to limit a waiting time for receiving the coded sub-packets. The packet correctness determination unit 236 is connected to the packet combination unit 233 and the wireless transceiver unit 231, and is configured for determining whether the information is successfully recovered, and replying an acknowledgement packet to the source node S according to whether the information is successfully recovered.

Referring to FIG. 2C, the memory unit 237 of the destination node 23 is connected to the wireless transceiver unit 231 and the packet combination unit 233, and is configured for storing a plurality of the coded sub-packets, the coded packet generated through the combination, and the information obtained by decoding the coded packet. The processing unit 238 is connected to the wireless transceiver unit 231, the wireless spectrum detector unit 232, the packet combination unit 233, the communication quality determination unit 234, the timer 235, the packet correctness determination unit 236 and the memory unit 237, and the processing unit 238 is configured for coordinating and controlling these units. After main functions of the source node 21, the relay node 22 and the destination node 23 are introduced, main steps of the method for the end-to-end hybrid automatic repeat request is further introduced with reference of FIG. 3.

Figure 3:
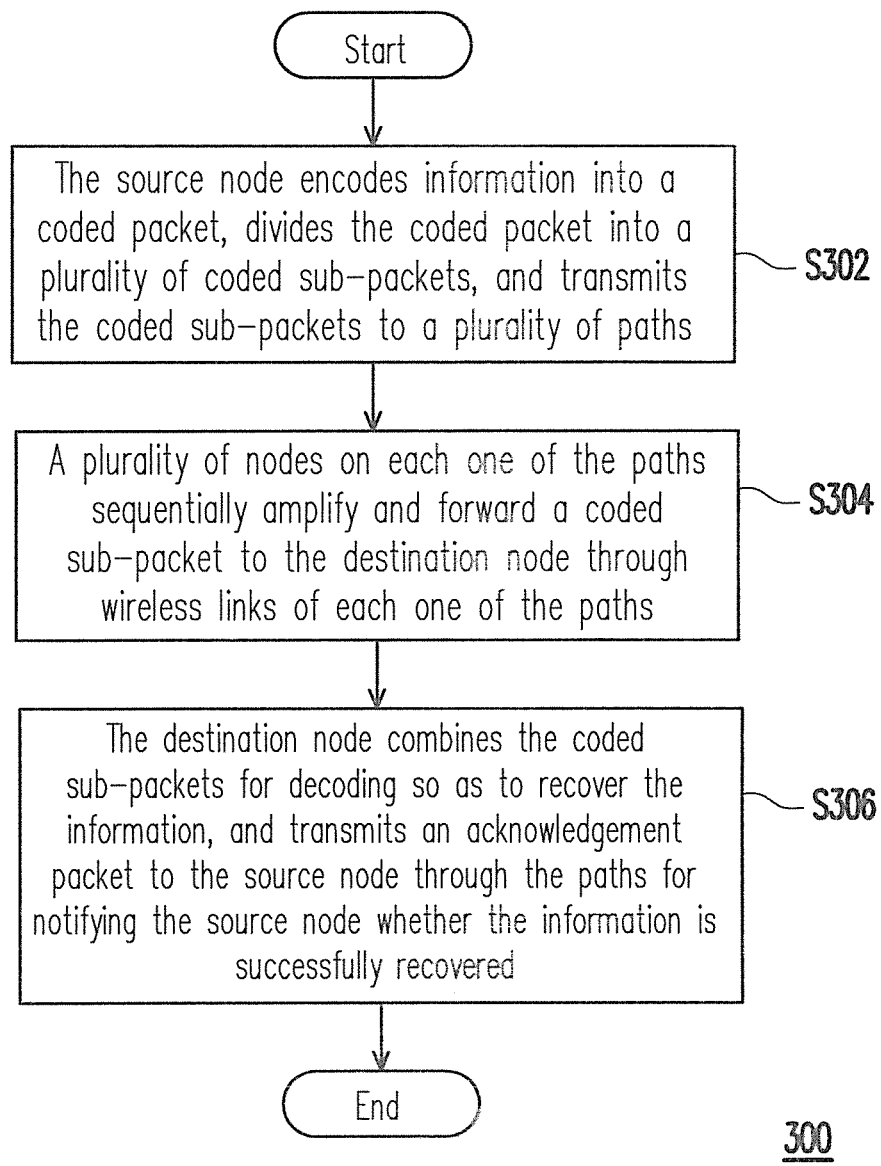
FIG. 3 is a flowchart illustrating a method for an end-to-end hybrid automatic repeat request according to an exemplary embodiment of the invention.

FIG. 3 is a flowchart illustrating a method 300 for an end-to-end hybrid automatic repeat request according to an exemplary embodiment of the invention. Referring to FIG. 1, FIG. 2A-FIG. 2C and FIG. 3, the method 300 for the end-to-end hybrid automatic repeat request is adapted to a CRN and is described as follows. In step S302, at the source node S, the packet divider unit 213 is configured to encode information into a coded packet and to divide the coded packet into a plurality of coded sub-packets, and then the wireless transceiver unit 211 is configured to transmit the coded sub-packets to a plurality of paths between the source node S and the destination node D. The paths are shown in FIG. 1, which are multi-hop relay paths formed by a plurality of relay nodes between the source node S and the destination node D. In step S304, the nodes (relay nodes) along each one of the paths in the CRN sequentially amplify and forward a coded sub-packet to the destination node D through a plurality of wireless links of each one of the paths.

In step S306, at the destination node D, the packet combination unit 233 is configured to combine one or a plurality of the coded sub-packets for decoding so as to recover the information, and transmit an acknowledgement packet to the source node S through the paths for notifying whether the information is successfully recovered. It is to be noted that the destination node D knows the exact end-to-end SNR value of each one of the paths to optimally combine coded sub-packets into a coded packet. If the information is not successfully recovered at the destination node D, the source node S will receive a negative acknowledgement packet from the destination node D, and the source node S can retransmit at least one coded sub-packet required by the destination node D until the destination node D successfully recovers the information. After the step S306, the method 300 for the end-to-end hybrid automatic repeat request is ended.

By encoding and dividing the information into a plurality of the coded sub-packets just at the source node S, and combining the coded sub-packets at the destination node D for decoding so as to recover the information, the method 300 for the end-to-end hybrid automatic repeat request implements an end-to-end hybrid automatic repeat request in a network layer or in a session level without performing error control and repeat request at the link layer between the neighbouring nodes along each one of the paths. Therefore, compared to a conventional method for an automatic repeat request, the method 300 for the end-to-end hybrid automatic repeat request may apparently increase packet transmission efficiency and an overall transmission throughput during the operation of the CRN. After the main steps of the method for the end-to-end hybrid automatic repeat request are introduced, the step S302 in which the packet divider unit 213 divides the coded packet into a plurality of the coded sub-packets and a method of transmitting the coded sub-packets to the paths are further described in detail with reference of FIG. 4.

Figure 4:
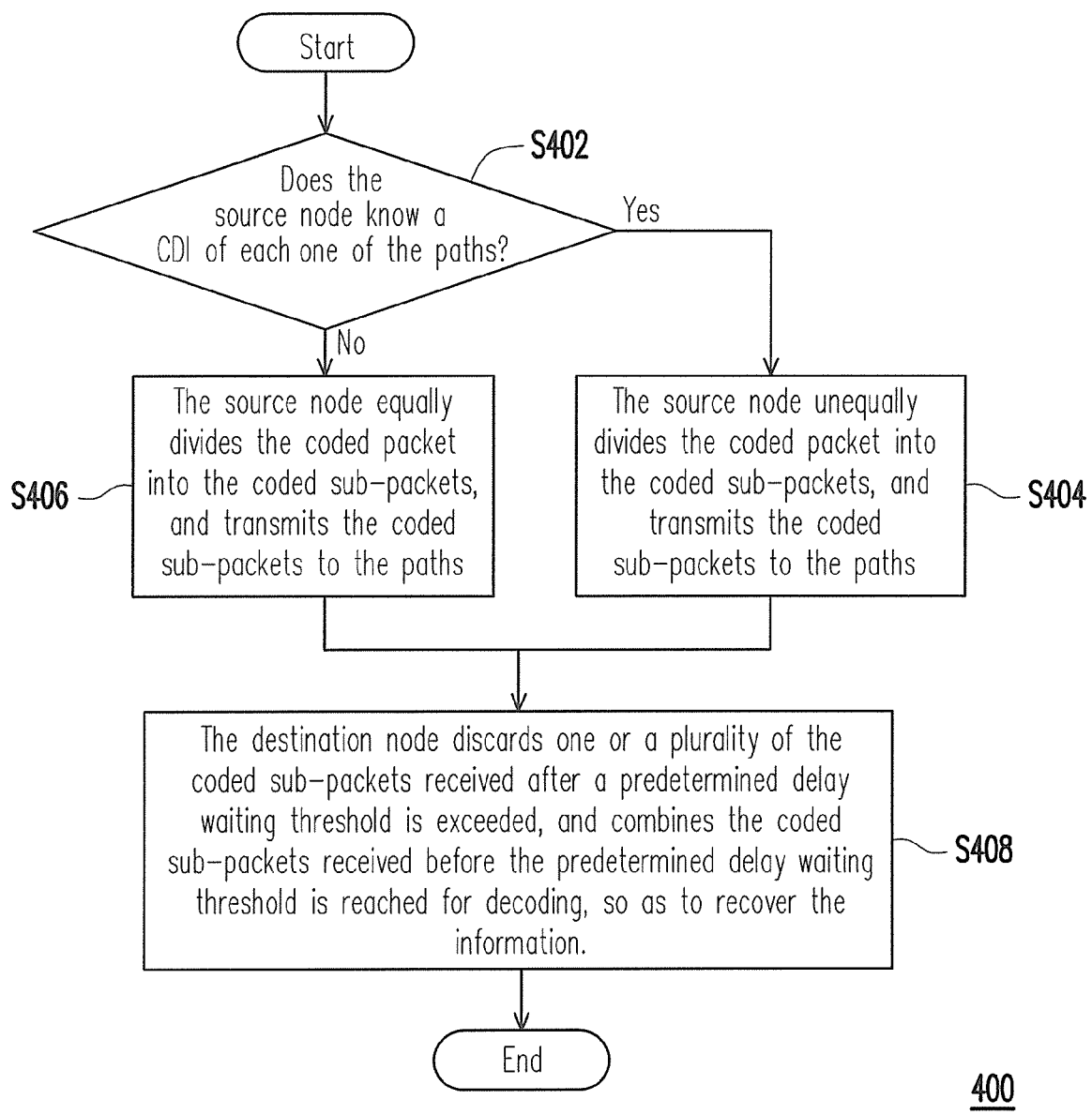
FIG. 4 is a flowchart illustrating a method for dividing packets and discarding packets according to an exemplary embodiment of the invention.

FIG. 4 is a flowchart illustrating a method 400 for dividing and discarding packets according to an exemplary embodiment of the invention. Referring to FIG. 1, FIG. 2A-FIG. 2C and FIG. 4, the method 400 for dividing and discarding packets includes following steps. In step S402, it is checked whether channel state information (CDI) of each one of the paths is known to the source node S. The CDI (or mean statistics) of different paths can be obtained after the destination node D receives and combines a plurality of the coded sub-packets and performs the follow-up decoding operation, and can be fed back from the destination node D to the source node S through an acknowledgement packet. After the step S402, if the CDI of each one of the paths is known to the source node S, a step S404 is executed, and if the CDI of each one of the paths is unknown to the source node S, a step S406 is executed. In other embodiments of the invention, an effective channel quality (for example, an effective end-to-end SNR) of each one of the paths may be used for determining whether the coded packet is equally or unequally divided into the coded sub-packets.

In the step S404, at the source node S, the packet divider unit 213 is configured to unequally divide the coded packet into the coded sub-packets, and the wireless transceiver unit 211 is configured to transmit the coded sub-packets to the paths. In the step S406, at the source node S, the packet divider unit 213 is configured to equally divide the coded packet into the coded sub-packets, and the wireless transceiver unit 211 is configured to transmit the coded sub-packets to the paths.

In step S408, when the destination node D receives a first coded sub-packet, the timer 235 starts to count, and the packet combination unit 233 discards one or a plurality of the coded sub-packets received after a predetermined delay waiting threshold is exceeded, and combines the coded sub-packets received before the predetermined delay waiting threshold is reached for decoding, so as to recover the information. The predetermined delay waiting threshold can be configured as 0.5 second to 0.7 second, though the invention is not limited thereto, and the predetermined delay waiting threshold can also be configured according to an actual application of the CRN. Since in the CRN, the delay time for transmitting the packet is continuously varied, the operation of the step S408 can limit a time in waiting for the coded sub-packets divided from one coded packet. After the step S408, the method 400 for dividing and discarding packets is ended. It should be noticed that in the present exemplary embodiment, the operation of dividing the packet is performed at the source node S, and the operation of discarding the packets is performed at the destination node D, though the invention is not limited thereto, and in other exemplary embodiments, just the operation of dividing the packet is performed at the source node S, and the operation of discarding the packets is not performed at the destination node D.

Moreover, in the above step S404, the source node S unequally divides one coded packet into a plurality of the coded sub-packets, wherein a proportion that the original coded packet is included in each one of the coded sub-packets is obtained by minimizing a following equation (1):

$$P^{out} = P\left(\sum_{i=1}^{L} w_i \log_2(1 + \gamma_{eqi}) < R\right), \quad \text{Equation (1)}$$

wherein, $P^{out}$ represents an effective end-to-end outage probability between the source node S and the destination node D, P(x) is a probability function, $w_i$ is a weight of an i-th path, which also represents a proportion that the original coded packet is included in an i-th coded sub-packet transmitted on the i-th path. A summation of all $w_i$'s equals to 1, $\gamma_{eqi}$ is an effective end-to-end SNR value of the i-th path, and R is the information rate of the source node.

According to another aspect, in the above step S404, the CDI of each path is known to the source node S. Therefore, at the source node S, the packet divider unit 213 can be configured to transmit a coded sub-packet having the maximum proportion of the coded packet to a first path having the highest mean statistics (from CDI), and transmit another coded sub-packet having the minimum proportion of the coded packet to a second path having the lowest mean statistics. The highest mean statistics and the lowest mean statistics are just relative comparison values of all of the paths rather, and are not absolute values. In this way, a spatial diversity of the paths between the source node S and the destination node D can be effectively utilized to increase the overall information rate of the effective channel formed by all of the paths, and accordingly reduce the effective end-to-end outage probability between the source node S and the destination node D.

According to the method for the end-to-end hybrid automatic repeat request of the invention, a number of the paths used for transmitting the coded sub-packets can be dynamically adjusted at the source node S, and a number of the paths used for receiving and combining the coded sub-packets can be dynamically adjusted at the destination node D according to effective communication quality states of each one of the paths. In this way, a feature of forward error control incremental redundancy of a puncture code can be effectively utilized, so that when the effective communication quality states of the multi-hop relay paths are continuously varied, a coding rate can be adaptively adjusted to achieve a relatively high transmission throughput. A coding rate adaptation method executed during a probe phase and a settling phase is further introduced below based on a method 300 for an end-to-end hybrid automatic repeat request with reference of FIG. 5.

Figure 5:
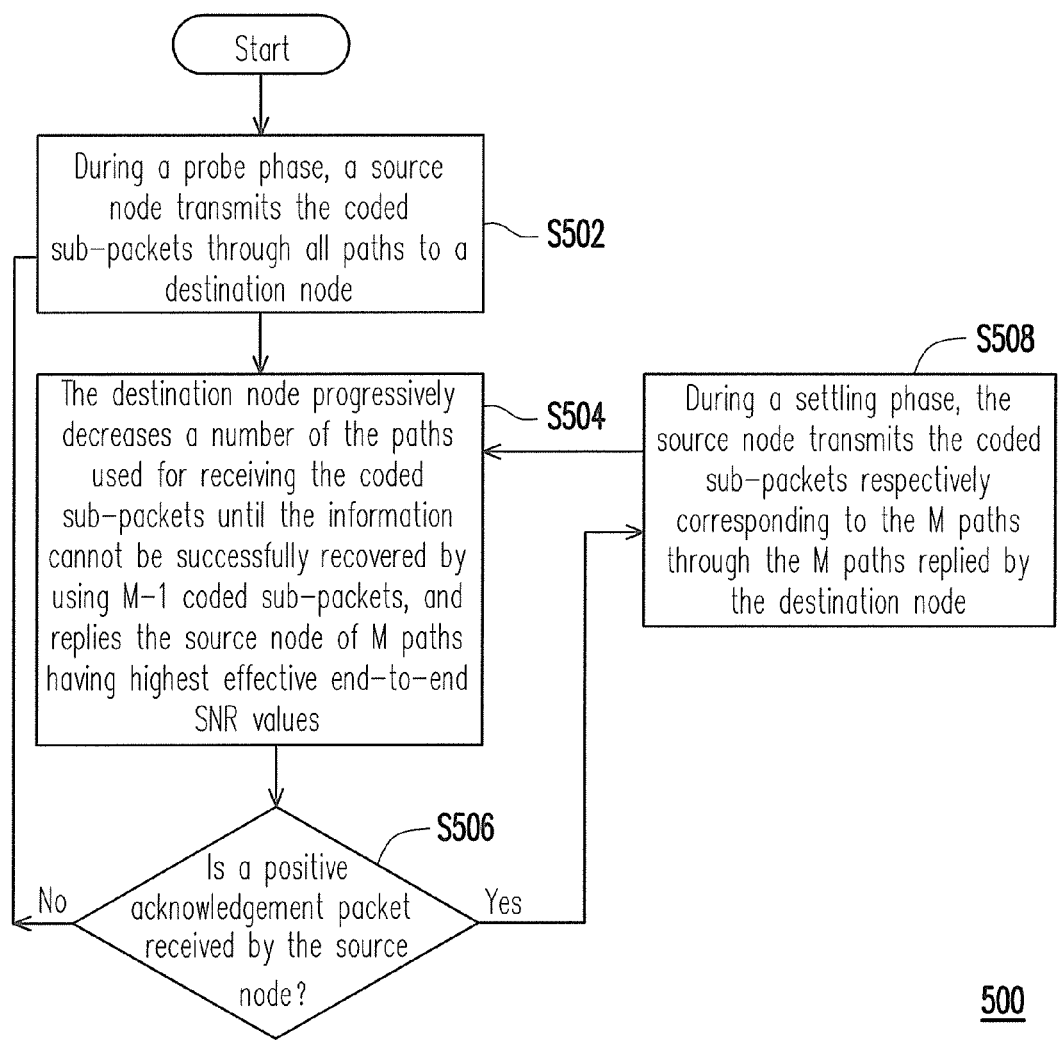
FIG. 5 is a flowchart illustrating a coding rate adaptation method according to an exemplary embodiment of the invention.

FIG. 5 is a flowchart illustrating a coding rate adaptation method 500 according to an exemplary embodiment of the invention. In the present exemplary embodiment, the coding rate adaptation method 500 is executed in collaboration with the method 300 for the end-to-end hybrid automatic repeat request and the method 400 for dividing and discarding packets. However, in other exemplary embodiments of the invention, the coding rate adaptation method 500 can also be executed just in collaboration with the method 300 for the end-to-end hybrid automatic repeat request. In the coding rate adaptation method 500, during a probe phase, the destination node D progressively decreases a number of the paths used for receiving and combining the coded sub-packets, and accordingly confirms a minimum number of the required paths and the corresponding paths. The coding rate adaptation method 500 enters a settling phase when the minimum number of the required paths is not varied, and the source node S progressively decreases a number of the paths used for transmitting the coded sub-packets.

Referring to FIG. 1, FIG. 2A-FIG. 2C and FIG. 5, the coding rate adaptation method 500 is described as follows. In step S502, during the probe phase, the source node S transmits the L coded sub-packets through all of the paths (i.e., L paths), where each one of the coded sub-packets corresponds to one of the paths. Namely, there is a one-to-one corresponding relationship between the L coded sub-packets and the L paths. In step S504, the destination node D progressively decreases a number of the paths used for receiving the coded sub-packets until the information cannot be successfully recovered by using M−1 coded sub-packets, and replies the source node S of the M paths having highest effective end-to-end SNR values through an acknowledgement packet, where M is an integer, and M is smaller than or equal to a summation of all of the paths, L. More precisely, in the step S504, during each decoding operation, the destination node D discards the coded sub-packet on one of the paths having the lowest effective end-to-end SNR value until the information cannot be successfully recovered by using the M−1 coded sub-packets. It is to be noted that, when the step S502 is transitioned to the step S504, the coding rate adaptation method 500 just transitions from the probe phase to the settling phase.

In step S506, the source node S determines whether a positive acknowledgement packet from the destination node D is received. If the source node S receives the positive acknowledgement packet from the destination node D, a step S508 is executed after the step S506. If the source node S receives a negative acknowledgement packet from the destination node D, it is returned to execute the step 502 after the step S506. It is to be noted that the coding rate adaptation method 500 just transitions from the settling phase to the probe phase when the step S506 is transitioned to the step S502. Moreover, when the step S506 is transitioned to the step S502, the destination node D just combines M of the coded sub-packets but does not successfully recovered the information by using the M coded sub-packets so a negative acknowledgement packet is transmitted from the destination node D for replying the source node S. Meanwhile, the source node S uses the remaining "L-M" paths to transmit the "L-M" coded sub-packets to the destination node D, where the "L-M" coded sub-packets were not used by the destination node D.

In the step S508, during the settling phase, the source node S uses the M paths replied by the destination node D to transmit the corresponding M coded sub-packets to the destination node D. After the step S508, it is returned to execute the step S504. It is to be noted that the aforementioned transitions between the steps are just broad descriptions. In fact, in a loop circulating from the step S504 to the step S506 to the step S508 and further to the step S504, the value of M can be maintained unchanged or decreased, depending upon how many coded sub-packets is used to successfully recover the information by the destination node D in the step S504. In addition, the time duration for which the coding rate adaptation method 500 steps in the settling phase is equivalent to the times of circulating in the loop for execution from the step S504 to the step S506 to the step S508 and further to the step S504.

Take an example for illustration, assuming the original situation is that the value of M is 4, and the destination node D uses the "M=4" of coded sub-packets to recover the information successfully, then in the step S506, the destination node D transmits a positive acknowledgement packet to the source node S and continues to execute the step S508. Meanwhile, in the step S508, the source node S will use the "M=4" paths to transmits 4 of the coded sub-packets corresponding to the next information. Three possible situations are described below for further illustrating how the value of M is changed in a loop from the step S504 to the step S506 to the step S508 and further to the step S504.

The first situation is that, in the destination node D actually uses "M=3" of coded sub-packets to successfully recover the information, and when the step S506 is transitioned to the step S506, the value of M is changed to "3". Moreover, the destination node D replies "M=3" of paths to the source node S, and the coding rate adaptation method 500 continues to execute the step S506 and the step S508. The second situation is that, in the step S504, the destination node D still needs to use "M=4" of coded sub-packets to successfully recover the information, and when the step S504 is transitioned to the step S506, the value of M is stilled maintained as 4. Furthermore, the destination node D replies the "M=4" paths to the source node S, and the coding rate adaptation method 500 continues to execute the step S506 and the step S508.

The third situation is that, in the step S504, the destination node D can no longer use the "M=4" coded sub-packets to successfully recover the information so in the step S506, the destination node D replies a negative acknowledgement packet to the source node S. Then, the coding rate adaptation method 500 will transition from the step S504 to the step S506 and further return to the step S502, but the source node S just transmits the remaining "L-M" coded sub-packets to the destination node D so that the destination node D can combine the previously received M coded sub-packets with the latest received "L-M" coded sub-packets to recover the information. In other words, the destination node D combines all of the L coded sub-packets to recover the information. If the information is successfully recovered at the destination node D, then the coding rate adaptation method 500 continues the loop from the step S504 to the step S506 to the step S508 and further to the step S504, so as to progressively decrease the number of coded sub-packets used in the recovering of the information, and obtain an appropriate value of M.

In the step S502, if the information cannot be recovered successfully even the L coded sub-packets are combined for decoding, then the source node can select to discard retransmitting the coded sub-packets, or return to the step S502 for executing the transmission of the coded sub-packets again. Based on the alternating operation between the probe phase and the settling phase, an overall incremental redundancy of the utilized puncture code can be reduced to increase the coding rate, so that the CRN may achieve a relatively high transmission throughput.

In summary, the invention provides a method for an end-to-end hybrid automatic repeat request and a system thereof. In the method, the source node encodes information into a coded packet, divides the coded packet into a plurality of coded sub-packets, and transmits the coded sub-packets to the paths. The nodes on each one of the paths sequentially amplify and forward a coded sub-packet to the destination node through a plurality of wireless links. The destination node combines the coded sub-packets for decoding so as to recover the information, and transmits an acknowledgement packet to the source node through the paths, so as to realize an efficient end-to-end hybrid automatic repeat request in the CRN. Moreover, the proportions applied for dividing the coded packet are adjusted according to CDIs of the end-to-end paths, and the transmission throughput of the CRN is further increased according to a coding rate adaptation method.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for an end-to-end hybrid automatic repeat request, adapted to a cognitive radio network (CRN) comprising at least a source node and a destination node, there being a plurality of paths between the source node and the destination node, and each one of the paths comprising a plurality of wireless links, the method for the end-to-end hybrid automatic repeat request comprising:

encoding information into a coded packet and dividing the coded packet into a plurality of coded sub-packets by the source code, wherein a proportion of information included in each one of the coded sub-packets is dynamically adjusted according to a channel distribution information (CDI);

dynamically adjusting a number of the paths used for forwarding the coded sub-packets according to a communication quality state, and transmitting the coded sub-packets to the paths by the source node;

sequentially amplifying and forwarding a coded sub-packet to the destination node through the wireless links of each one of the paths; and combining the coded sub-packets for decoding so as to recover the information, and transmitting an acknowledgement packet to the source node through the paths by the destination node for notifying the source node whether the information is successfully recovered.

2. The method for the end-to-end hybrid automatic repeat request as claimed in claim 1 is characterized in the following technical features:

the CRN coexists with a primary wireless network, and the primary wireless network has a utilization priority for a licensed wireless spectrum;

the CRN is a secondary wireless network having a plurality of nodes, and each one of the nodes in the secondary wireless network uses the licensed wireless spectrum just when one or a plurality of neighbouring nodes in the primary wireless network is not in operation;

when one of the nodes in the secondary wireless network is about to transmit information, said one node is the source node, and a destination of the information is the destination node; and a wireless link between two neighbouring nodes in the CRN is a uni-directional opportunistic wireless link, and a plurality of the uni-directional opportunistic wireless links forms a path, and each one of the paths has a feature of multi-hop relay.

3. The method for the end-to-end hybrid automatic repeat request as claimed in claim 2, wherein the step of dividing the coded packet into the coded sub-packets, and transmitting the coded sub-packets to the paths further comprises:

if the channel distribution information (CDI) of each one of the paths is unknown to the source node, equally dividing the coded packet into the coded sub-packets, and transmitting the coded sub-packets to the paths by the source node; and discarding one or a plurality of the coded sub-packets received after a predetermined delay waiting threshold is exceeded, and combining one or a plurality of the coded sub-packets received before the predetermined delay waiting threshold is reached for decoding by the destination node, so as to recover the information.

4. The method for the end-to-end hybrid automatic repeat request as claimed in claim 2, wherein the step of dividing the coded packet into the coded sub-packets, and transmitting the coded sub-packets to the paths further comprises:

if the CDI of each one of the paths is known to the source node, unequally dividing the coded packet into the coded sub-packets, and transmitting the coded sub-packets to the paths by the source node.

5. The method for the end-to-end hybrid automatic repeat request as claimed in claim 2, further comprising:

transmitting, the coded sub-packets to the destination node through all of the paths during a probe phase by the source node;

decreasing progressively, a number of the paths used for receiving the coded sub-packets by the destination node, wherein at the destination node, a coded sub-packet on a path having a worst effective end-to-end signal-to-noise ratio (SNR) value is discarded during each decoding until the information is unable to be successfully recovered by using M−1 coded sub-packets, and M paths having highest effective end-to-end SNR values are replied to the source node, wherein M is an integer and the probe state is transitioned to a settling phase;

transmitting the M coded sub-packets respectively corresponding to the M paths to the destination node through the M paths replied by the destination node during the settling phase if an acknowledgement packet replied by the destination node is received at the source node; and transitioning from the settling phase to the probe phase if a negative acknowledgement packet replied by the destination node is received by the source node during the settling probe.

6. The method for the end-to-end hybrid automatic repeat request as claimed in claim 4, wherein a proportion that the coded packet is included in each one of the coded sub-packets is obtained by minimizing a following equation (1):

$$P^{out} = P\left(\sum_{i=1}^{L} w_i \log_2(1 + \gamma_{eqi}) < R\right), \quad \text{Equation (1)}$$

wherein $P^{out}$ is an effective end-to-end outage probability between the source node and the destination node, $P(x)$ is a probability function, $w_i$ is a weight of an i-th path, and $w_i$ also represents a proportion that the coded packet is included in an i-th coded sub-packet transmitted on the i-th path, a summation of all $w_i$'s equals to 1, $\gamma_{eqi}$ is an effective end-to-end SNR value of the i-th path, and R is the information rate of the source node.

7. A method for an end-to-end hybrid automatic repeat request, adapted to a cognitive radio network (CRN) comprising at least a source node and a destination node, there being a plurality of paths between the source node and the destination node, and each one of the paths having a plurality of wireless links, the method for the end-to-end hybrid automatic repeat request comprising:

dividing a coded packet into a plurality of coded sub-packets by the source code, wherein a proportion of information included in each one of the coded sub-packets is dynamically adjusted according to a channel distribution information (CDI);

dynamically adjusting a number of the paths used for forwarding the coded sub-packets according to a communication quality state, and transmitting the coded sub-packets to the paths by the source node;

sequentially amplifying and forwarding a coded sub-packet to the destination node through the wireless links of each one of the paths; and combining the coded sub-packets for decoding so as to recover the coded packet, and transmitting an acknowledgement packet to the source node through the paths by the destination node for notifying the source node whether the coded packet is successfully recovered.

8. The method for the end-to-end hybrid automatic repeat request as claimed in claim 7 is characterized in the following technical features:

the CRN has a plurality of nodes, and each one of the nodes in the CRN uses a licensed wireless spectrum just when one or a plurality of neighbouring nodes in a primary wireless network is not in operation;

when one of the nodes in the CRN is about to transmit information, said one node is the source node, and a destination of the information is the destination node; and a wireless link between two neighbouring nodes in the CRN is a uni-directional opportunistic wireless link, and a plurality of the uni-directional opportunistic wireless links forms a path, and the path has a feature of multi-hop relay.

9. The method for the end-to-end hybrid automatic repeat request as claimed in claim 8, wherein the step of dividing the coded packet into the coded sub-packets, and transmitting the coded sub-packets to the paths further comprises:

selecting to equally or unequally divide the coded packet into the coded sub-packets according to the CDI of each one of the paths, and transmitting the coded sub-packets to the paths by the source node; and selectively discarding one or a plurality of the coded sub-packets according to a predetermined delay waiting threshold, and combining one or a plurality of the remained coded sub-packets for decoding by the destination node, so as to recover the coded packet.

10. The method for the end-to-end hybrid automatic repeat request as claimed in claim 9, further comprising:

transmitting, the coded sub-packets through all of the paths during a probe phase by the source node;

progressively decreasing, a number of the paths used for receiving the coded sub-packets by the destination node, wherein at the destination node, a coded sub-packet on a path having a worst effective end-to-end signal-to-noise ratio (SNR) value is discarded during each decoding until the coded packet is unable to be successfully recovered by using M−1 coded sub-packets, and M paths having highest effective end-to-end SNR are replied to the source node, wherein M is an integer; and during a settling phase, at the source node, and the probe phase is transitioned to a settling phase;

transmitting the M coded sub-packets respectively corresponding to the M paths replied by the destination node to the destination node through the M paths replied by the destination node during the settling phase if an acknowledgement packet replied by the destination node is received at the source node; and transitioning from the settling phase to the probe phase if a negative acknowledgement packet replied by the destination node is received by the source node during the settling phase.

11. An end-to-end hybrid automatic repeat request system, adapted to a cognitive radio network (CRN) having a plurality of nodes, the end-to-end hybrid automatic repeat request system comprising:

a source node, configured for encoding information into a coded packet and dividing the coded packet into a plurality of coded sub-packets, wherein a proportion of information included in each one of the coded sub-packets is dynamically adjusted according to a channel distribution information (CDI), and dynamically adjusting a number of the paths used for forwarding the coded sub-packets according to a communication quality state when the source node is about to transmit the information to a destination node, wherein the source node is one of the nodes in the CRN;

the nodes, configured for sequentially amplifying and forwarding the coded sub-packets from the source node to the destination node, and amplifying and forwarding an acknowledgement packet from the destination node to the source node, wherein the nodes form a plurality of paths between the source node and the destination node, and the source node transmits the coded sub-packets to the paths; and the destination node, configured for combining the coded sub-packets for decoding so as to recover the information, and transmitting an acknowledgement packet to the source node through the paths for notifying whether the information is successfully recovered.

12. The end-to-end hybrid automatic repeat request system as claimed in claim 11 is characterized in the following technical features:

the CRN coexists with a primary wireless network, the primary wireless network has a utilization priority for a licensed wireless spectrum, and the CRN is a secondary wireless network, and each one of the nodes in the secondary wireless network uses the licensed wireless spectrum just when one or a plurality of neighbouring nodes in the primary wireless network is not in operation;

each one of the paths comprises a plurality of wireless links, the nodes in each one of the paths sequentially amplify and forward a coded sub-packet from the source node to the destination node respectively; and a wireless link between two neighbouring nodes in the CRN is a uni-directional opportunistic wireless link, a plurality of the uni-directional opportunistic wireless links forms a path, and the path has a feature of multi-hop relay.

13. The end-to-end hybrid automatic repeat request system as claimed in claim 12 is characterized in the following technical features:

if the CDI of each one of the paths is unknown to the source node, the source node equally divides the coded packet into the coded sub-packets, and transmits the coded sub-packets to the paths; and the destination node discards one or a plurality of the coded sub-packets received after a predetermined delay waiting threshold is exceeded, and combines one or a plurality of the coded sub-packets received before the predetermined delay waiting threshold is reached for decoding, so as to recover the information.

14. The end-to-end hybrid automatic repeat request system as claimed in claim 12, wherein if the CDI of each one of the paths is known to the source node, the source node unequally divides the coded packet into the coded sub-packets, and transmits the coded sub-packets to the paths.

15. The end-to-end hybrid automatic repeat request system as claimed in claim 13 is characterized in the following technical features:

during a probe phase, the source node transmits the coded sub-packets through all of the paths, and the destination node progressively decreases a number of the paths used for receiving the coded sub-packets, wherein the destination node discards a coded sub-packet on a path having a worst effective end-to-end signal-to-noise ratio (SNR) value during each decoding until the information is unable to be successfully recovered by using M−1 coded sub-packets, and replies M paths having highest effective end-to-end SNR values to the source node, wherein M is an integer and the probe phase is transitioned to a settling phase;

the source node transmits the M coded sub-packets respectively corresponding to the M paths to the destination node through the M paths replied by the destination node during the settling phase if an acknowledgement packet replied by the destination node is received at the source node; and the settling phase is transitioned to the probe phase if a negative acknowledgement packet replied by the destination node is received by the source node during the settling phase.

16. The end-to-end hybrid automatic repeat request system as claimed in claim 14, wherein a proportion that the coded packet is included in each one of the coded sub-packets is obtained by minimizing a following equation (1):

$$P^{out} = P\left(\sum_{i=1}^{L} w_i \log_2(1+\gamma_{eqi}) < R\right),$$ Equation (1)

wherein $P^{out}$ is an effective end-to-end outage probability between the source node and the destination node, $P(x)$ is a probability function, $w_i$ is a weight of an i-th path, and $w_i$ also represents a proportion that the coded packet is included in an i-th coded sub-packet transmitted on the i-th path, a summation of all $w_i$'s equals to 1, $\gamma_{eqi}$ is an effective end-to-end SNR value of the i-th path, and R is the information rate of the source node.

17. An end-to-end hybrid automatic repeat request system, adapted to a cognitive radio network (CRN) having a plurality of nodes, the end-to-end hybrid automatic repeat request system comprising:

a source node, configured for dividing a coded packet into a plurality of coded sub-packets, wherein a proportion of information included in each one of the coded sub-packets is dynamically adjusted according to a channel distribution information (CDI), and dynamically adjusting a number of the paths used for forwarding the coded sub-packets according to a communication quality state when the source node is about to transmit the coded packet to a destination node, wherein the source node is one of the nodes in the CRN;

the nodes, configured for sequentially amplifying and forwarding the coded sub-packets to the destination node, and amplifying and forwarding an acknowledgement packet to the source node, wherein the nodes form a plurality of paths between the source node and the destination node, and the source node transmits the coded sub-packets to the paths; and the destination node, combining the coded sub-packets for decoding so as to recover the coded packet, and transmitting the acknowledgement packet to the source node through the paths for notifying the source node whether the coded packet is successfully recovered.

18. The end-to-end hybrid automatic repeat request system as claimed in claim 17 is characterized in the following technical features:

each one of the nodes in the CRN uses a licensed wireless spectrum just when one or a plurality of neighbouring nodes in a primary wireless network is not in operation; and a wireless link between two neighbouring nodes in the CRN is a uni-directional opportunistic wireless link, and a plurality of the uni-directional opportunistic wireless links forms a path, and the path has a feature of multi-hop relay.

19. The end-to-end hybrid automatic repeat request system as claimed in claim 18 is characterized in the following technical features:

the source node selects to equally or unequally divides the coded packet into the coded sub-packets according to the CDI of each one of the paths, and transmits the coded sub-packets to the paths; and the destination node selectively discards one or a plurality of the coded sub-packets according to a predetermined delay waiting threshold, and combines one or a plurality of the remained coded sub-packets for decoding, so as to recover the coded packet.

20. The end-to-end hybrid automatic repeat request system as claimed in claim 18 is characterized in the following technical features:

the source node transmits the coded sub-packets through all of the paths during a probe phase, and the destination node progressively decreases a number of the paths used for receiving the coded sub-packets, wherein the destination node discards a coded sub-packet on a path having a worst effective end-to-end signal-to-noise ratio (SNR) value during each decoding until the coded packet is unable to be successfully recovered by using M−1 coded sub-packets, and replies M paths having highest effective end-to-end SNR values to the source node, wherein M is an integer and the probe phase is transitioned to a settling phase;

the source node transmits the M coded sub-packets respectively corresponding to the M paths to the destination node through the M paths replied by the destination node if an acknowledgement packet replied by the destination node is received at the source node during the settling phase; and the settling phase is transitioned to a probe phase if a negative acknowledgement packet is received by the source node during the settling phase.

* * * * *